United States Patent
Chi et al.

(10) Patent No.: US 10,345,164 B2
(45) Date of Patent: Jul. 9, 2019

(54) PRESSURE SENSING METHOD AND SYSTEM THEREOF

(71) Applicant: TPK Touch Solutions (Xiamen) Inc., Xiamen (CN)

(72) Inventors: Ho-Hsun Chi, Hsinchu (TW); Tsai-Kuei Wei, Hsinchu (TW); Caijin Ye, Xiamen (CN); Huaibin Zheng, Zhangzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 241 days.

(21) Appl. No.: 15/389,459

(22) Filed: Dec. 23, 2016

(65) Prior Publication Data
US 2017/0184461 A1 Jun. 29, 2017

(30) Foreign Application Priority Data

Dec. 23, 2015 (CN) .......................... 2015 1 0974216

(51) Int. Cl.
*G01L 1/22* (2006.01)
*G06F 3/041* (2006.01)

(52) U.S. Cl.
CPC .......... *G01L 1/2281* (2013.01); *G01L 1/2262* (2013.01); *G06F 3/0414* (2013.01); *G06F 3/0418* (2013.01)

(58) Field of Classification Search
CPC ...................................................... G01L 1/2281
See application file for complete search history.

(56) References Cited

U.S. PATENT DOCUMENTS

| | | | |
|---|---|---|---|
| 2008/0271933 A1* | 11/2008 | Morimoto .............. | A61B 5/447 178/18.05 |
| 2011/0037487 A1* | 2/2011 | Fang ..................... | G06F 3/0416 324/679 |
| 2011/0227863 A1* | 9/2011 | Cheng .................... | G06F 3/044 345/174 |
| 2013/0321327 A1* | 12/2013 | Lee ....................... | G06F 3/0416 345/174 |

* cited by examiner

*Primary Examiner* — Manuel L Barbee
*Assistant Examiner* — Raymond L Nimox
(74) *Attorney, Agent, or Firm* — Cooper Legal Group, LLC (57) ABSTRACT

A pressure sensing method and a system thereof are disclosed. The pressure sensing method includes following steps. Stored resistance values $R_n$ are read and a differential resistance value $\Delta R_n$ between resistance valises at adjacent moments are calculated. At least one $\Delta R_n/R_{n-1}$ is obtained. The at least one $\Delta R_n/R_{n-1}$ or a sum of plural $\Delta R_n/R_{n-1}$ is compared to at least one predefined database. A pressing force value $F_n$ corresponding to the at least one $\Delta R_n/R_{n-1}$ or the sum of the plural $\Delta R_n/R_{n-1}$ is obtained, so as to detect and process a pressure sensing signal precisely.

20 Claims, 5 Drawing Sheets

PRESSURE SENSING METHOD AND SYSTEM THEREOF

RELATED APPLICATIONS

This application claims priority to China Application Serial Number 201510974216.2, filed Dec. 23, 2015, which is herein incorporated by reference.

TECHNICAL FIELD

The disclosure relates to the field of pressure sensing, and more particularly to a pressure sensing method and system thereof.

BACKGROUND

With the technology of touch panels constantly renewing in recent years, touch panels have become an essential element of the display apparatus. And touch panels with pressure sensing function have attracted more and more attentions. Resistive pressure sensing electrodes usually use piezo resistive materials to make pressure sensing electrodes. By detecting the resistance value change of the pressure sensing electrodes before and after being pressed, the pressing force value is determined according to the correspondence between the resistance value change and the pressing. force value. However, the resistance value change of the pressure sensing electrodes would also be influenced by the operating environment, the structure of the pressure sensing electrodes themselves or the characteristics of the materials. Furthermore, the different ways of obtaining the signal values and mathematical operation would also lead to distortions of the pressure sensing signals.

SUMMARY

To overcome the problem of pressure sensing signals distortions, the disclosure provides a pressure sensing method and the system thereof, which may precisely obtain the maximum amount of deformation resistance value. In order to solve the technical problem mentioned, the disclosure provides a technical method: a pressure sensing method, suitable for being applied on a pressure sensing electrode having an initial resistance value $R_0$, the pressure sensing method comprising: a step Q11 for sequentially obtaining and storing a plurality of resistance values at different scanning moments; a step Q12 for reading a resistance value $R_{n-1}$ of a (n-1)-th scanning moment and a. resistance value $R_n$ of an n-th scanning moment of the stored resistance values, and calculating a differential resistance value $\Delta R_n$ between resistance values at adjacent moments, and retrieving, a resistance relative change $\Delta R_n/R_{n-1}$ where n is a positive integer: and a step Q13 for matching the resistance relative change $\Delta R_n/R_{n-1}$ with a least one predefined database, so as to obtain a pressing force value $F_n$ corresponding to the resistance relative change $\Delta R_n/R_{n-1}$.

In at least one embodiment, the disclosure provides a technical method: a. pressure sensing method, suitable for being applied on a pressure sensing electrode having an initial resistance value $R_0$, the pressure sensing method comprising: a step S11 for obtaining and storing at least one resistance value $R_n$; a step S12 for reading the stored at least one resistance value Rn, calculating a differential resistance value $\Delta R_n$ between resistance values at adjacent moments, obtaining at least one resistance relative change $\Delta R_n/R_{n-1}$ according to the differential resistance value $\Delta R_n$ and another resistance value $R_{n-1}$ obtained at a moment previous to the resistance value $R_n$, afterward, calculating a sum of the at least one resistance relative change $\Delta R_n/R_{n-1}$, and obtaining the sum of the at least one resistance relative change $\Delta R_n/R_{n-1}$; and a step S13 for matching the sum of resistance relative change $\Delta R_n/R_{n-1}$ with at least one predefined database, so as to obtain a pressing force value $F_n$ corresponding the sum of resistance relative change $\Delta R_n/R_{n-1}$.

In at least one embodiment, the disclosure provides a technical method: a pressure sensing system, suitable for being applied on a plurality of pressure sensing electrodes, each of the pressure sensing electrodes having an initial resistance value $R_0$, the pressure sensing system comprising: a resistance detection module configured for obtaining a plurality of resistance values of the plurality of pressure sensing electrodes: a storing module configured for storing the resistance values obtained by the resistance detection module a computing module configured for calculating the resistance values stored in the storing module, based on a resistance value $R_{n-1}$ at a (n-1)-th scanning moment and another resistance value $R_n$ at a n-th scanning moment, the computing module calculating and obtaining a differential resistance value $\Delta R_n$ between resistance values at adjacent moments and at least one resistance relative change $\Delta R_n/R_{n-1}$; and a comparing module configured for matching the at least one resistance relative change $\Delta R_n/R_{n-1}$ calculated by the computing module with a pressing force value $F_n$ in a predefined database, and accordingly exporting the pressing force value $F_n$, where n is a positive integer.

In at least one embodiment, the disclosure provides a technical method: a pressure sensing system, suitable for being applied on a plurality of pressure sensing electrodes, each of the pressure sensing electrodes having an initial resistance value $R_0$, the pressure sensing system comprising: a resistance detection module configured for obtaining a plurality of resistance values of the pressure sensing electrodes; a storing module configured for storing the resistance values obtained by the resistance detection module a computing module configured for calculating the resistance values stored in the storing module, based on a resistance value $R_{n-1}$ at the (n-1)-th scanning moment and another resistance value $R_n$ at the n-th scanning moment, the computing module calculating and obtaining a differential resistance value $\Delta R_n$ between resistance values at adjacent moments and at least one resistance relative change $\Delta R_n/R_{n-1}$, and then summing up the at least one resistance relative change $\Delta R_n/R_{n-1}$, and so as to obtain a sum of the at least one resistance relative change $\Delta R_n/R_{n-1}$; and a comparing module, suitable for matching the sum of the at least one resistance relative change $\Delta R_n/R_{n-1}$ calculated by the computing module with a pressing force value $F_n$ within a predefined database, and accordingly exporting the pressing force value $F_n$, where n is a positive integer.

With respect to the prior art, the pressure sensing method and the system thereof provided in the disclosure may precisely obtain the maximum amount of deformation resistance value and effectively reduce the variation factors and the noise signals caused by the existing value calculation method, thus the corresponding pressing force value $F_n$ is chosen precisely. Using the pressure sensing method and the system thereof provided in the disclosure, the pressure sensing signal is detected and processed effectively without particularly limiting the materials or the structures of the pressure sensing electrodes. Also, in the disclosure, the influences of variation factors when determining the pressing force value is reduced by only using single pressure sensing electrode layers, which may save the materials or the crafts, increase the yield rate, and be more in accordance with the trend of thinning the pressure sensing electrodes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition the present. disclosure may repeat reference numerals and/or letters in the various examples. This repetition is for the purpose of simplicity and clarity and does not in itself dictate a relationship between the various embodiments and/or configurations discussed.

In the disclosure, the materials for the pressure sensing layer are transparent conductive oxide, such as Indium Tin Oxide (ITO) and other similar metal oxides, the resistance of which would increase while the temperature increases and the resistance of which would decrease while deformed due to pressing forces. The pressure sensing layer includes pressure sensing electrodes, and a pressure sensing electrode comprises a plurality of pressure sensing electrode blocks. The pressure sensing electrode block has air initial resistance value $R_0$.

Different pressure sensing electrodes or different pressure sensing electrode blocks of the same pressure sensing electrode usually have differences in initial resistance value. After the pressure sensing electrodes (or the pressure sensing electrode blocks) being under pressing forces, the differences of the initial resistance value would influence the amount of resistance value change brought by the deformation and temperature. Wherein, the reason for initial resistance value differences may be but not limited to the following: environmental factors, such as temperature, humidity and so on; or being influenced by the factors of the structures or materials of the mentioned pressure sensing electrode itself. In the aforementioned factors that cause the differences of the initial resistance value, the temperature factor is the one that influences the most.

Figure 1:
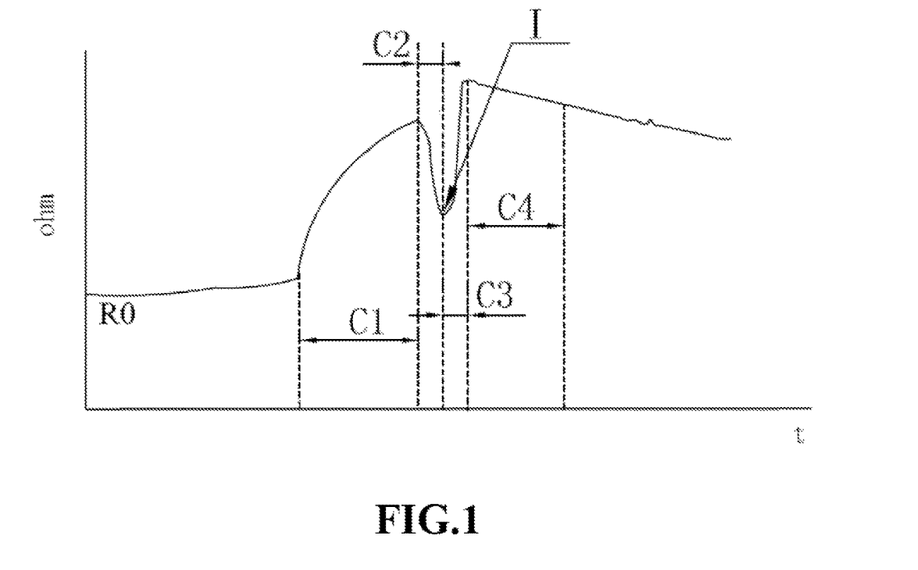
FIG. 1 is a chart illustrating a resistance value-time relationship of a onetime pressing process.

When the finger is pressing on the panel of the pressure sensing electrodes or the pressure sensing electrode blocks, the pressure sensing electrodes (or the pressure sensing electrode blocks) are influenced by the pressing forces or other factors that caused the differences, the resistance value of which would change as well. FIG. 1 illustrates a resistance value-time chart of a pressing process. As shown in FIG. 1, a pressing process comprises the following four stages:

First Stage: Before the finger touches the pressure sensing electrode, the pressure sensing electrode has an initial value $R_0$; during the process from finger touching the pressure sensing electrode to adding forces, the resistance value of the pressure sensing electrode would have resistance increase as shown in the C1 segment of FIG. 1, the resistance increase is mainly caused by the temperature factor. What should be mentioned specifically is that in order to distinguish the differences of the influence on resistance value between touching and pressing in FIG. 1, the time of the first stage is extended specially. In the actual pressing process, the first stage usually takes only a short period of time; furthermore, due to the influence of the environment temperature, the possible increase range and duration of the first stage are small.

Second stage: After the finger adds pressure on the pressure sensing electrode, the resistance value of the pressure sensing electrode would decrease rapidly as shown in the C2 segment of FIG. 1.

Third stage: After the finger leaves the pressure sensing electrode, the pressure sensing electrode would recover from deformation as shown in the C3 segment of FIG. 1, which is the resilience of the pressure sensing electrode after being pressed, the resistance value change caused by which is equal to the change of resistance value caused by finger pressing.

Fourth stage: After the finger leaves and the pressure sensing electrode totally recover from the deformation, the pressure sensing electrode has a natural cooling process. Because the resistance value of the pressure sensing electrode is directly proportional to temperature, therefore, as shown in the C4 segment of FIG. 1, the resistance value of the pressure sensing electrode would decrease over time.

Wherein, by detecting the amount of resistance value change as in the aforementioned second stage, the corresponding pressing force value is obtained. In order to detect the pressing force value by the resistance value change more precisely, an aspect of the disclosure is to provide a pressure sensing method of obtaining the corresponding pressing force value according to the differential resistance value $\Delta R_n$ between resistance values at adjacent moments (where n is a positive integer). As shown in FIG. 1, the resistance value change caused by the pressing force has a trend of decreasing; therefore, the actual pressing force value may be reflected by the. differential resistance value $\Delta R_n$ between resistance values at adjacent moments.

As shown in FIG. 1, in some embodiments, besides the finger pressing force, there are other factors that may cause the resistance value change (such as temperature factor) therefore the pressure sensing method of obtaining the corresponding pressing force value according to the differential resistance value $\Delta R_n$ between resistance values at adjacent moments is unable to eliminate the influences of the differences in initial resistance value.

In order to solve the aforementioned problem, the following method is further provided in the disclosure: use $\Delta R_n/R_{n-1}$ (where n is a positive integer) to replace the differential resistance value $\Delta R_n$ to reflect the amount of resistance value change caused by the deformation of the pressure sensing electrodes due to pressing forces or caused by other factors that lead to the amount of resistance value change, the specific reasons are as following:

In the disclosure, the resistance change of the pressure sensing electrode caused by the temperature factor may be as the following Table 1-A and Table 1-B:

TABLE 1-A

| Item | Temperature | $R_{n-1}$ (ohm) | $\Delta R_n$ (ohm) | $\Delta R_n/R_{n-1}$ |
|---|---|---|---|---|
| 1 | −20° C. | 65140.6 | | |
| 2 | −10° C. | 65476.5 | 158.149 | 0.242% |
| 3 | 0° C. | 65784.1 | 140.022 | 0.213% |
| 4 | 10° C. | 66086.2 | 149.495 | 0.227% |
| 5 | 20° C. | 66412.2 | 178.447 | 0.269% |
| 7 | 30° C. | 66779.6 | 171.215 | 0.257% |
| 8 | 40° C. | 67105.6 | 165.072 | 0.247% |
| 9 | 50° C. | 67445.1 | 161.203 | 0.240% |
| 10 | 60° C. | 67780.4 | 157.546 | 0.260% |

Table 1-A is a table showing the relationship between the temperature factor and the pressure sensing electrode.

Note: In Table 1-A, the initial resistance value of the pressure sensing electrode under the temperature of −20° C. is 65140.6.

TABLE 1-B

| Item | Temperature | $R_{n-1}$ (ohm) | $\Delta R_n$ (ohm) | $\Delta R_n/R_{n-1}$ |
|---|---|---|---|---|
| 1 | −20° C. | 145825 | | |
| 2 | −10° C. | 146477 | 304.90 | 0.209% |
| 3 | 0° C. | 147062 | 261.74 | 0.178% |
| 4 | 10° C. | 147641 | 277.18 | 0.188% |
| 5 | 20° C. | 148272 | 340.94 | 0.230% |
| 7 | 30° C. | 149013 | 343.45 | 0.231% |
| 8 | 40° C. | 149672 | 340.10 | 0.241% |
| 9 | 50° C. | 150366 | 333.38 | 0.222% |
| 10 | 60° C. | 151102 | 102.89 | 0.267% |

Table 1-B is a table showing the relationship between the temperature factor and the pressure sensing electrode.

Note: In Table 1-B, the initial resistance value of the pressure sensing electrode under the temperature of −20° C. is 145825.

In the aforementioned Table 1-A and Table 1-B, $\Delta R_n$ means the differential resistance value between the resistance value of the pressure sensing electrode and the resistance value of the pressure sensing electrode at the previous temperature under different temperature environment. And $\Delta R_n/R_{n-1}$ means the proportion of $\Delta R_n$ and $R_{n-1}$ under different temperature environment, where $\Delta R_n$ means the differential resistance value between the resistance value of the pressure sensing electrode and the resistance value of the pressure sensing electrode at the previous temperature, and $R_{n-1}$ means the resistance value at the previous temperature, where n is a positive integer.

As shown in Table 1-A, the initial resistance value $R_0$ of a pressure sensing electrode is 65140.6, in the temperature range of −20° C.~60° C., the average value of R is about 66400, the average value of $\Delta R_n$ is about 165, and the average value of $\Delta R_n/R_{n-1}$ is about 0.249%. By comparing Table 1-A and Table 1-B it is shown that there is misjudgment risk while obtaining the differential resistance value between resistance values at adjacent moments of two kinds of pressure sensing electrode (or pressure sensing electrode block) with different initial resistance value, therefore using the value of $\Delta R_n$ could rot reflect the resistance value change caused by the temperature or other factors of the environment precisely. On the other hand, two different pressure sensing electrode (or pressure sensing electrode block) with different initial resistance value have closer values of $\Delta R_n/R_{n-1}$, so $\Delta R_n/R_{n-1}$ could reflect the resistance value change of the pressure sensing electrode caused by the temperature or other factors of the environment precisely.

Furthermore, when the finger adds forces on the pressure sensing layer, the resistance value change of the pressure sensing, electrode (or the pressure sensing electrode block) caused by the pressing force of the finger could be shown as:

TABLE 2

| Initial resistance value $R_0$ | 74672.41 | | 151492.39 | |
|---|---|---|---|---|
| Item | $\Delta Rn$ (ohm) | $\Delta Rn/Rn-1$ | $\Delta Rn$ (ohm) | $\Delta Rn/Rn-1$ |
| 150 g | −10.45 | −0.014% | −25.87 | −0.017% |
| 400 g | −22.57 | −0.030% | −54.65 | −0.036% |
| 800 g | −45.06 | −0.060% | −101.64 | −0.067% |
| 1000 g | −55.13 | −0.074% | −121.64 | −0.080% |

Table 2 is a table showing the resistance value change of the pressure sensing electrodes with different initial resistance value $R_0$ caused by different pressing force value of the finger.

As shown in Table 2, when the pressure sensing electrodes with different initial value $R_0$ are under the pressing force value with the range of 150 g-1000 g while the pressing force value increases, the $\Delta R_n$ would increases as well, and the two kinds of pressure sensing electrodes (or pressure sensing electrode blocks) with different initial resistance values $R_0$ have similar values of $\Delta R_n/R_{n-1}$.

Therefore, using the value of $\Delta R_n/R_{n-1}$ to express the change brought by the pressing force value or other factors that influence the resistance value (such as temperature factor) could eliminate the large differences between the value of $\Delta R_n$ due to the different initial resistance value $R_0$ of the pressure sensing electrodes (or pressure sensing electrode blocks), that is. the variation of the resistance value change between pressure sensing electrodes (or pressure sensing electrode blocks) with different. initial resistance value $R_0$ could be eliminated effectively, and provides a possibility for measuring different pressure sensing electrodes (or pressure sensing electrode blocks) with the same standard.

The aforementioned Table 1-A, Table 1-B and Table 2 are only one part of the data chosen for giving an example. In the practical applications, the specific. values (such as value obtaining time, resistance value, and so on) may be adjusted according to the actual demands and are not limited here.

Figure 2:
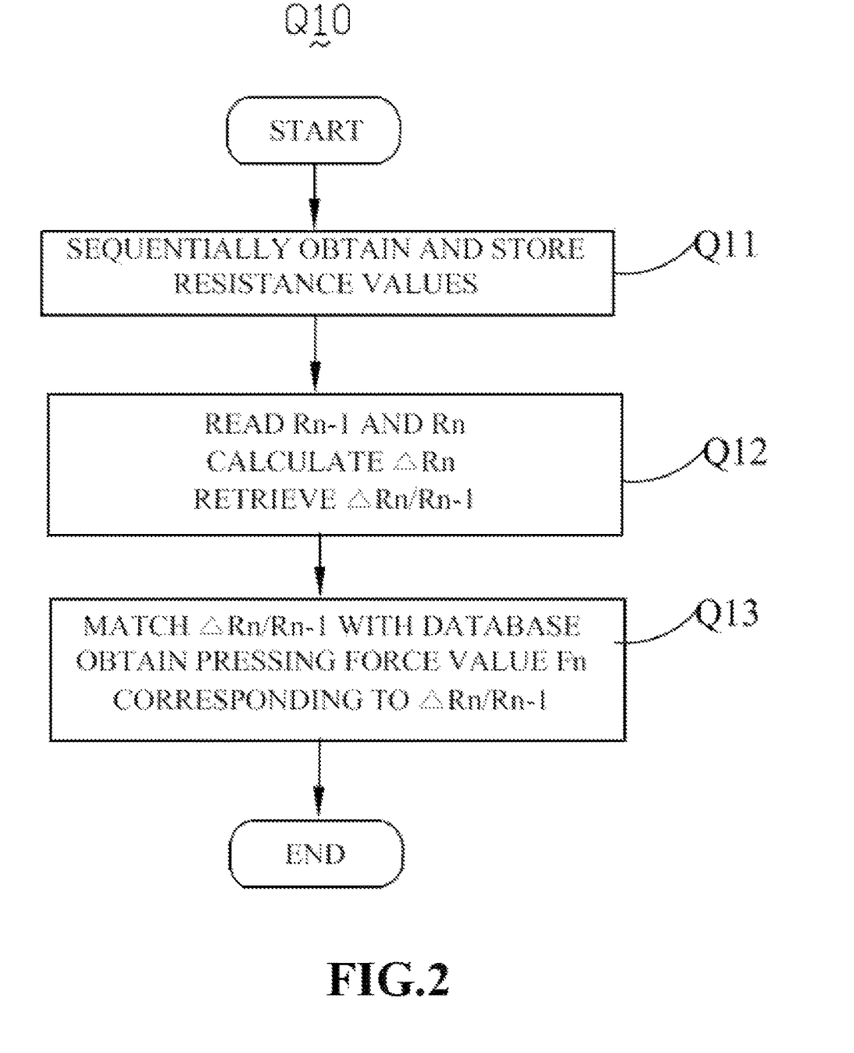
FIG. 2 is a flow chart illustrating a pressure sensing method according to some embodiments of the disclosure.

Reference is made to FIG. 2, some embodiments of the disclosure provides a pressure sensing method Q10, with a pressure sensing electrode provided and having an initial resistance value $R_0$, the pressure sensing method Q10 comprises the following steps:

Step Q11, the resistance value $R_n$ of the n-th scanning moment are sequentially obtained and stored;

Step Q12, the resistance value $R_{n-1}$ and $R_n$ of the n−1th and the n-th scanning moments are read and the differential resistance value $\Delta R_n$ ($\Delta R_n = R_n - R_{n-1}$) between resistance values at adjacent moments are calculated, and the resistance relative change $\Delta R_n/R_{n-1}$ is obtained; and Step Q13, a pressing force value $F_n$ corresponding the resistance relative change $\Delta R_n/R_{n-1}$ is obtained by matching the resistance relative change $\Delta R_n/R_{n-1}$ with at least one predefined database.

Wherein, in the aforementioned steps Q11-Q13, n of the resistance value $R_n$ is a positive integer.

In some embodiments, the resistance value of the adjacent previous moment is shown as resistance value $R_{n-1}$, and the adjacent next moment is shown as resistance value $R_n$. The differential resistance value $\Delta R_n$ between resistance values at adjacent moments means the differential resistance value between the resistance value $R_{n-1}$ of the adjacent previous moment and the resistance value $R_n$ of the adjacent next moment, which could also be shown as $\Delta R_n = R_n - R_{n-1}$. During the process of finger pressing, the resistance value $R_{n-1}$ of the previous moment is bigger than the resistance value $R_n$. At this time, the differential resistance value $\Delta R_n$ between resistance values at adjacent moments is $\Delta R_n = R_n - R_{n-1} < 0$, that is, $\Delta R_n$ is a negative integer. And when the finger stops pressing, the resistance value has an upward trend due to the influences of temperature or other variation factors, that is, the resistance value of the previous moment $R_{n-1}$ is smaller than the resistant value $R_n$, and at this time, the differential resistance value $\Delta R_n$ between resistance values at adjacent moments is $\Delta R_n = R_n - R_{n-1} > 0$, that is, $\Delta R_n$ is a positive integer.

In some embodiments, before step Q11 may further comprising:

Step P101, a system is provided and continuously scans the touch electrode; and

Step P102 determines whether a touch position signal is detected; if yes then executes step Q11 and detects the resistance value of the pressure sensing electrode; if no, then executes P101 repeatedly.

The step Q11 may further be subdivided into:

Step Q111, obtaining the plurality of resistance values of pressing operation by the method of Wheatstone bridge;

Step Q112, amplifying the resistance value $R_n$ by an amplifier comparator;

Step Q113, transforming the amplified resistance values to a digital signal by an analog to digital converter; and Step Q114, storing the digital signal.

In the aforementioned step Q12, before reading at least one resistance value $R_n$, whether the resistance value is in a continuously decreasing trend may also be determined. It is determined by reading the stored digital signal in the aforementioned step Q114 and comparing the value between resistance values $R_n$ of adjacent moments according to time sequence.

The time interval of obtaining and recording the resistance value $R_n$ of adjacent moments of the pressure sensing electrodes (or the pressure sensing blocks) may be adjusted according to the actual needs when detecting and processing the pressure sensing signals. For example, the tune interval of sampling may be 100 ms 150 ms, 200 ms, or 300 ms, and it is not limited here, In the aforementioned step Q11-Q13, the obtaining of the resistance value $R_n$ and the operating of matching the $\Delta R_n/R_{n-1}$ in accordance with the resistance value $R_n$ With the predefined database are continuous and are executing at the same time, until a pressing force calculation cycle terminates, that is, until the finger leaves the pressure sensing electrode.

In the aforementioned step Q13, the n of the pressing force value $F_n$ is a positive integer.

Based on the resistance value $R_n$ and the resistance relative change $\Delta R_n/R_{n-1}$ of adjacent moments that are in correspondence with different pressing forces added on the pressure sensing electrodes, the predefined database simulating. calculates the pressing force value F, corresponding the resistance relative change $\Delta R_n/R_{n-1}$, and formed the data by warping the data of the mentioned $\Delta R_n/R_{n-1}$ and the corresponding pressing force value $F_n$. In some other embodiments, the mentioned predefined database is able to simulate calculate according to the related conditions of the materials, structure and/or sensitivity of the whole pressure sensing layer and obtain a predefined database that is more targeted.

In some embodiments, the pressing force value $F_n$ corresponding to the $\Delta R_n/R_{n-1}$ is obtained by simulate calculating the pressing force gradient $\Delta F_n$ in accordance with the $\Delta R_n/R_{n-1}$ and then calculating the pressing force value $F_n$ according to the pressing force gradient $\Delta F_n$ of adjacent moments. Wherein, the pressing force gradient $\Delta F_n$ and the pressing force value $F_n$ follows the following formula:

$$F_n = F_{n-1} + \Delta F_n \tag{1};$$

Wherein, the pressing force value $F_{n-1}$ means the pressing force value that is a moment previous to the pressing force value $F_n$ where n is a positive integer.

In some embodiments, the predefined database may have the function of data correction. The data in step Q13 is entered to the predefined database in order to further compare, match or analysis the corrected data with the $\Delta R_n/R_{n-1}$ data.

Furthermore, in order to further process and analyze the pressure sensing precisely, the resistance value change of the pressure sensing electrodes (or the pressure sensing blocks) caused by the deformation is further refined.

Figure 3A:
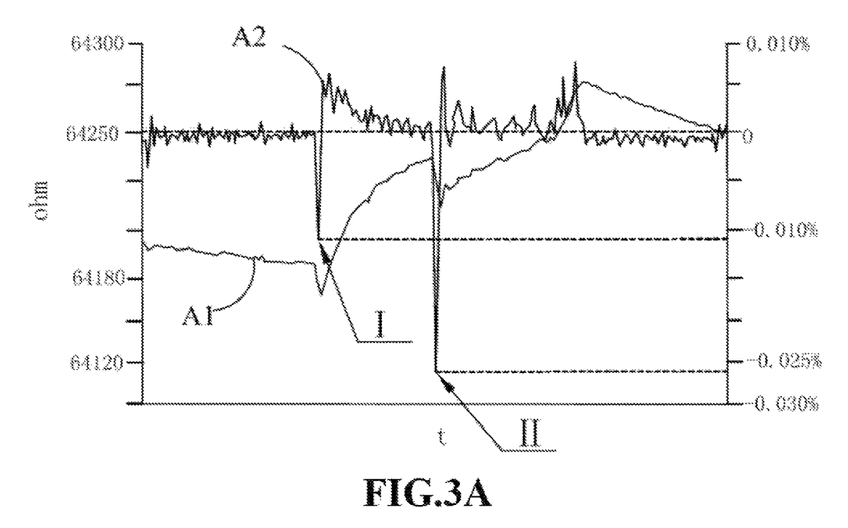
FIG. 3A is a chart illustrating a resistance value-time relationship and the $\Delta R_n/R_{n-1}$ value-time relationship of two time pressing process.
Figure 3B:
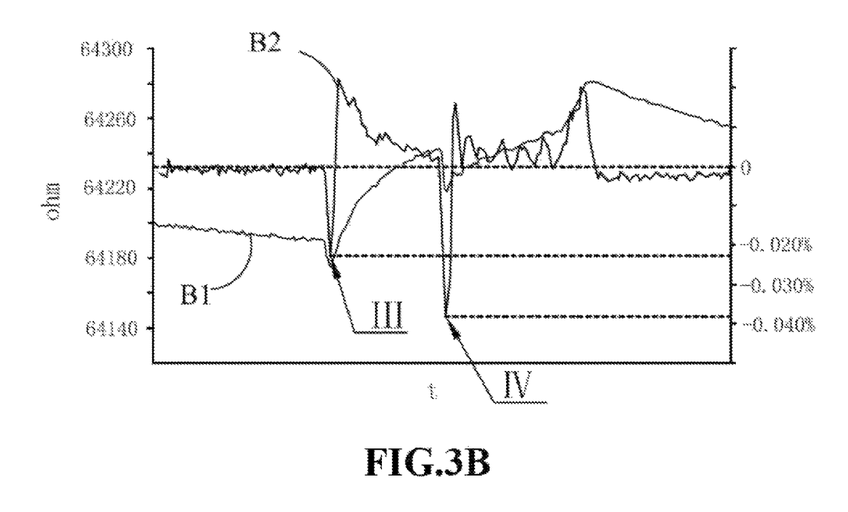
FIG. 3B is a chart illustrating a relationship between the sum of $\Delta R_n/R_{n-1}$ value after summation calculation based on FIG. 3A and time.

Reference is made to FIG. 3A and FIG. 3B. FIG. 3A and FIG. 3B illustrate the same finger pressing process. To be more specific, in FIG. 3A and FIG. 3B, the curves that A1 and B1 point to are both the curve of the resistance value $R_n$ variation caused by deformation of the pressure sensing electrodes during the pressing process. As shown in FIG. 3A, the curve that A2 points to is the curve of $\Delta R_n/R_{n-1}$ variation, wherein:

$$\Delta R_n = R_n - R_{n-1},$$

where n is a positive integer;

Resistance value $R_n$ means the resistance value of the next. moment, and resistance value $R_{n-1}$ means the resistance value of the previous moment. As shown in FIG. 3B, the curve that B2 points to is the curve of $$\sum_{n=1}^{m} (\Delta R_n / R_{n-1})$$

value variation, where $$\sum_{n=1}^{m} (\Delta R_n / R_{n-1})$$

means the sum of $\Delta R_n/R_{n-1}$ during the deformation process of the pressure sensing electrodes. The curve that B2 points to is obtained by adding up the $\Delta R_n/R_{n-1}$ at the adjacent moments of deformation process on the basis of A2 curve of FIG. 3A, where:

$$\sum_{n=1}^{m}(\Delta R_n/R_{n-1}) = \Delta R_1/R_0 + \Delta R_2/R_1 + \ldots + \Delta R_n/R_{n-1};$$

When the cumulative value of $\Delta R/R_{n-1}$ is negative or the resistance value $R_{n-1}$ of the previous moment is bigger than the resistance value $R_n$ of the next moment, the cumulating calculation starts; when $\Delta R/R_{n-1}$ is negative and the resistance value $R_{n-1}$ of the previous moment is smaller than the resistance value $R_n$ of the next moment, the cumulating calculation terminates.

Wherein, the I and II of the A2 curve in FIG. 3A separately means the maximum deformation value of the first pressing force and the maximum deformation value of the second pressing force; and the III and IV of the B2 curve in FIG. 3B separately means the maximum deformation value of the first pressing force and the maximum deformation value of the second pressing force as well.

Compare the A2 curve in FIG. 3A and the B2 curve in FIG. 3B, the value of $\Delta R_n/R_{n-1}$ that I points to is about 0.010%, and the value of $$\sum_{n=1}^{m}(\Delta R_n/R_{n-1})$$

that III points to is about 0.020%, it is seen that the value at point III is bigger than the value at point I. Similarly, the value of $\Delta R_n/R_{n-1}$ that II points to is about 0.025%, and the value of $$\sum_{n=1}^{m}(\Delta R_n/R_{n-1})$$

that IV points to is about 0.040% it is seen that the value at point IV is bigger than the value at point I.

When calculating the amount of resistance value change of the pressure sensing electrodes (or the pressure sensing electrode blocks), larger amount of deformation resistance value change is obtained by using the method of adding up $\Delta R_n/R_{n-1}$ as shown in FIG. 2, and the recognition of deformation is more conducive.

In order to use the aforementioned method to obtain the value of $\Delta R_n/R_{n-1}$ and determine the force that the pressing forces add on the pressure sensing electrodes (or the pressure sensing electrode blocks), further method for obtaining the value is in need. For example, the time unit of obtaining the value is set to be a fixed time (such as once every 100 ms, or once every 200 ms and so on), and set the cycle of obtaining the value to be in fixed time difference (such as 300 ms, or 400 ms and so on).

It is assumed that during a onetime pressing process of a pressure sensing electrode, the cycle of obtaining the value is set to be 300 ms, and the interval between each time of obtaining the value is 100 ms, in the pressing process, the resistance value of the pressure sensing electrode time table is shown as Table.3:

TABLE 3

| Item | Time(ms) | $R_n$ (ohm) | $\Delta R_n$ (ohm) | $\Delta R_n/R_{n-1}$ |
|---|---|---|---|---|
| 1 | 0 | 67416.2532 | 0.077 | 0.000% |
| 2 | 100 | 67416.7311 | 0.4779 | 0.001% |
| 3 | 200 | 67416.74 | 0.0089 | 0.000% |
| 4 | 300 | 67413.3642 | −3.3758 | −0.005% |
| 5 | 400 | 67404.6309 | −8.7333 | −0.013% |
| 6 | 500 | 67411.5829 | 6.952 | 0.010% |
| 7 | 600 | 67416.6498 | 5.0669 | 0.008% |

Table 3 is a resistance value of the pressure sensing electrode time table of a onetime pressing process.

As shown in Table 3, when the detection tune is set to be between 200 ms-300 ms, the resistance values $R_n$ of the pressure sensing electrode decrease, take the resistance values $R_n$ that are continuously decreasing to calculate and get the $\Delta R_n/R_{n-1}$ that correspond to the detection time.

To be more concrete, when $\Delta R_n/R_{n-1}$ appear to be a negative value, start accumulation until $\Delta R_n/R_{n-1}$ appear to be a positive value, and the maximum value of deformation is obtained to be −0.018%, that is, the value of $$\sum_{n=1}^{m}(\Delta R_n/R_{n-1})$$

is (−0.005%)+(−0.013%)=−0.018%. And if it is assumed that the regular intervals is set to be 300 ms to obtain multiple resistance values $R_n$ in the rated time and calculate the corresponding $\Delta R_n/R_{n-1}$ obtained, then in the calculation the situation of two positive values being calculated in one after another may appears (For example, adding the $\Delta R_n/R_{n-1}$=0.000% corresponding to the detection time of 200 ms or adding the $\Delta R_n/R_{n-1}$=0.010% corresponding to the detection time of 500 ms is in need), then the value of $$\sum_{n=1}^{m}(\Delta R_n/R_{n-1})$$

that obtained after calculation is too large, and is unfavorable for distinguishing the maximum value of the pressing deformation in practice, It is seen that during the pressing process as in Table 3, the deformation process of the pressure sensing electrode caused by the pressing in practice does not correspond to the set cycle of 300 ms. And in practical applications, due to the fact that the speed and the force of the finger pressing is unable to keep consistent, therefore, obtaining the resistance value $R_n$ with a fixed time value is unable to reflect the finger pressing process and the change of the pressing forces.

In order to recognize and further analyze the effective pressing gesture, in the disclosure, the resistance value $R_n$ is obtained by the method of obtaining the resistance value $R_n$ at the moment before and after the deformation process of the pressure sensing electrode after being pressed by the finger, and the amount of resistance value change of the pressure sensing electrodes (or pressure sensing electrode blocks) according to the pressing force is reflected precisely, that is, the value is obtained from the signals of the finger touching the panel on the pressure sensing: electrodes is detected, and terminates when the signals of finger touching is not detected.

Figure 4:
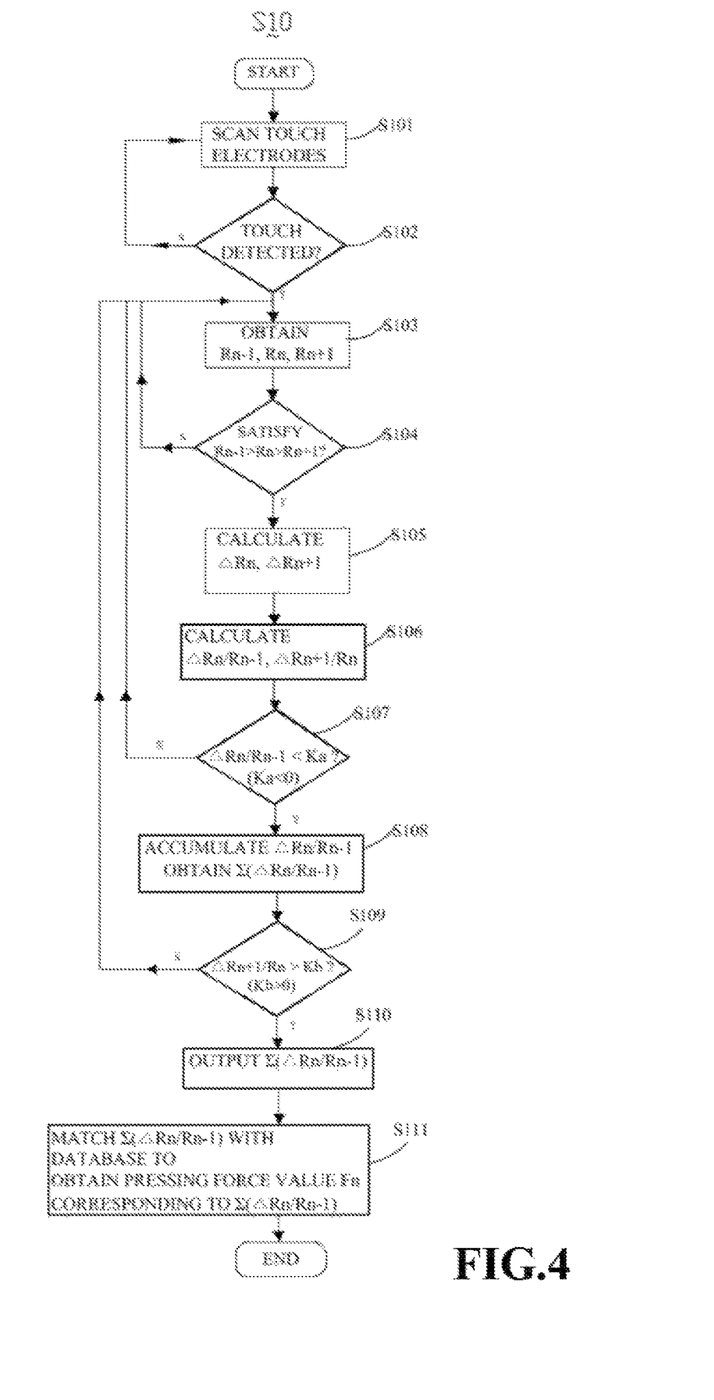
FIG. 4 is a flow diagram illustrating a pressure sensing method according to some embodiments of the disclosure.

Reference is made to FIG. 4, some embodiments provide another pressure sensing method S10, with pressure sensing electrodes provided, the pressure sensing. method S10 further comprises the following steps:

Step S101, scanning the touch electrode;

Step S102, determining whether a touch position signal is detected; if yes, then executes step S103; if no, then executes step S101 repeatedly.

Step S103, obtaining and storing the resistance values $R_{n-1}$, $R_n$ and $R_{n+1}$ of adjacent moments.

Step S104, determining whether the resistance values obtained by step S103 satisfy $R_{n-1} > R_n > R_{n+1}$ (that is, the resistance values $R_n$ is decreasing continuously), if yes, then executes step S105, if no, the goes back to step S103.

Step S105, reading the resistance values $R_{n-1}$, $R_n$ and $R_{n+1}$ of adjacent moments, and calculating to obtain the differential resistance value $\Delta R_n$, $\Delta R_{n+1}$ between resistance values; at adjacent moments.

Step S106, calculating and obtaining $\Delta R_n/R_{n-1}$ and $\Delta R_{n+1}/R_n$;

Step S107, determining whether $\Delta R_n/R_{n-1}$ is smaller than default value Ka; if yes, than executes step S108, if no, then goes back to execute step S103 and obtain the resistance value of the next moment.

Step S108, storing and adding up $\Delta R_n/R_{n-1}$ to obtain the sum of $\Delta R_n/R_{n-1}$.

Step S109, determining whether $\Delta R_{n+1}/R_n$ is bigger than the default value Kb or not: if yes, then goes to step S110, if no, then goes back to step S103 and obtains the resistance value of the next moment;

Step S110, terminating cumulating calculation and exporting the sum of $\Delta R_n/R_{n-1}$; and Step S111, matching with at least one predefined database according to the sum of $\Delta R_n/R_{n-1}$, and obtaining the pressing force value $F_n$ corresponding to the sum of $\Delta R_n/R_{n-1}$.

In the aforementioned steps S101-S110, n is a positive integer.

In some embodiments, the aforementioned resistance values $R_{n-1}$, $R_n$ and $R_{n+1}$ before and after the moments of obtaining the values means continuously obtaining the resistance values of adjacent moments of the pressure sensing electrodes during a onetime pressing procedure. For example, it may be $R_0$, $R_1$ and $R_2$, or it may be $R_{10}$, $R_{11}$ and $R_{12}$, and so on. The mentioned resistance values of the adjacent moments obtained are only examples and are not limited here.

In some other embodiments of the disclosure, the resistance values $R_{n-1}$, $R_n$ and $R_{n+1}$ of adjacent moments in the aforementioned procedures may also be shown as $R_m$ . . . $R_{n-1}$ and $R_n$, where in is a positive integer. The determination of the number of values obtained and the selection of adjacent moments are not limited to neighboring adjacent moments. For example, the resistance values $R_n$ of the pressures sensing electrodes obtained may be the resistance values at the starting moment and terminating moment of the deformation after being pressed; or the resistance values $R_n$ may also be the resistance values at some arbitrary moments of the deformation of the pressure sensing electrodes. The aforementioned ranges of obtaining the values are only examples and are not limited here.

The differential resistance values between resistance values at adjacent moments means obtaining differential resistance values between resistance values at adjacent moments based on intervals of unit time. For example, the differential resistance values $\Delta R_n$ or $\Delta R_{n+1}$ between resistance values are resistance values of adjacent moments or resistance values of nonadjacent moments.

In the aforementioned step S105, S106 and S107, the meaning of $\Delta R_n/R_{n-1}$ and the explanation of being positive or negative are the same as those mentioned beforehand and are not discussed here. In the aforementioned step S105, S106 and S108, $\Delta R_{n+1}/R_n$ means the proportion of the differential resistance value $\Delta R_n/R_{n-1}$ calculated by the resistance value of the next moment $R_{n+1}$ minus the resistance value of the previous moment $R_n$ and the resistance value $R_n$ of the previous moment. From the above it is seen that if $\Delta R_{n+1}/R_n$ is positive, than the resistance value of the previous moment in the adjacent moments is bigger than the resistance value of the next moment in the adjacent moments. And if $\Delta R_{n+1}/R_n$ is negative, than vice versa.

When the $\Delta R_n/R_{n-1}$ and the $\Delta R_{n+1}/R_n$ are a negative value and a positive value, it means that there is a inflection point of the resistance value change of the adjacent moments, such as the junction of C2 segment and C3 segment on the curve of resistance value variation after the pressure sensing electrodes being pressed by the finger as shown in FIG. 1. At the time, if $\Delta R_{n+1}/R_n$ is bigger than the default value Kb, then terminates the cumulating calculation of step S107; if $\Delta R_{n+1}/R_n$ is smaller than the default value Kb then continuous on obtaining the next value, and goes on to step S107 to accumulate.

The default value Ka and the default value Kb are simulating calculated under the circumstances with different variation factors being set by the system. The default value Ka means under simulating calculation, the maximum value of the resistance value change after finger pressing that is able to be detected, and the default value Ka is smaller than zero; the default value Kb means the minimum resistance value change of the pressure sensing electrodes that is able to be detected while the pressure sensing electrode is influenced by the factors that caused the differences of resistance values, the default value Kb is bigger than zero.

In some embodiments, the aforementioned factors that caused the differences in resistance values may be but not limited to the temperature differences between the pressing object and the pressure sensing electrodes, the positive peak slope and negative peak slope brought by the fluctuations due to the sensitivity of the detection system itself, the slope movement due to rebounds of pressure sensing electrodes being quick pressed, etc.; in practical applications, the default value Ka and the default value Kb may be adjusted according to the actual overall pressure sensing mode, where materials, structures, sensitivity and other variation factors are included.

In some other embodiments of the disclosure, due to different ways of finger pressing, the pressure sensing signals in accordance are different as well; therefore, the procedures of pressure sensing signals detection may be adjusted according to the actual pressing situations.

In the disclosure, the operating of obtaining the resistance value $R_{n-1}$, the resistance value $R_n$ or the resistance value $R_{n+1}$, the operating of calculation and the operating of matching are continuous and progressing at the same time, and stop while a pressing force calculation cycle terminates.

In some other embodiments of the disclosure, the pressure sensing method is used not only at detecting the pressing, force $F_n$ of onetime pressing operation but also at detecting the pressing force value $F_n$ of multiple-time pressing operations or onetime multi-stage operations. Specifically, because the pressure sensing method may obtain the value during the deformation process after the pressure sensing electrodes being pressed instead of calculating and obtaining the value at fixed time. Therefore, the pressure sensing method is applicable to different types of pressing operations.

In order to relatedly process the signals better, the disclosure may further limit the pressure sensing system.

Figure 5:
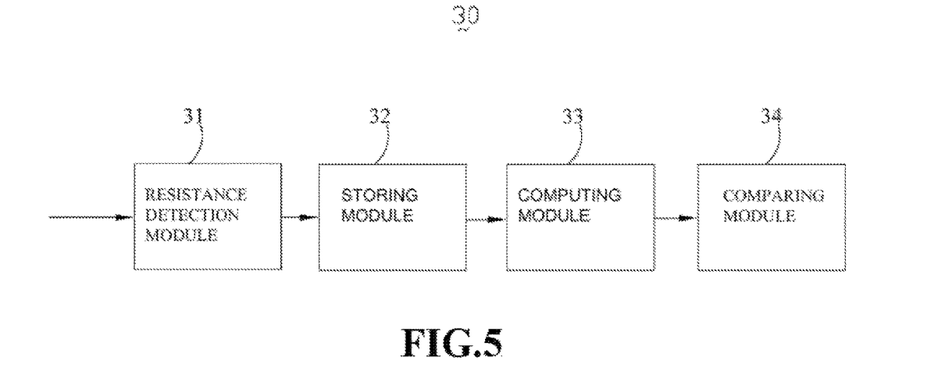
FIG. 5 is a schematic diagram illustrating a pressure sensing system according to some embodiments of the disclosure.

Reference is made to FIG. 5, some other embodiments of the disclosure provide a pressure sensing system 30, which comprise plurality pressure sensing electrodes and a resistance detection module 31 connected to the pressure sensing electrodes, a storing module 32 connected to the resistance detection module 31, a computing module 33 connected to the storing module 32, a comparing module 34 connected to the computing module 33.

Wherein, the pressure sensing electrodes are suitable for detecting the pressing forces.

The resistance detection module 31 is suitable for obtaining the resistance values $R_n$ of the pressure sensing electrode.

The storing module 32 is suitable for storing the resistance values $R_n$ detected by the resistance detection module 31.

The computing module 33 is suitable for calculating the resistance values $R_n$ stored in the storing module 32, and calculates and obtains the differential resistance value $\Delta R_n$ between resistance values at adjacent moments and at least one resistance relative change $\Delta R_n/R_{n-1}$; and The comparing module 34 is suitable for matching the at least one resistance relative change $\Delta R_n/R_{n-1}$ that the computing module 33 calculated and obtained with a pressing force value $F_n$ according to the predefined database, and exports the pressing force value $F_n$ in accordance.

Wherein, $R_{n-1}$ means the resistance value of the previous moment of the resistance value $R_n$, where n is an integer. The expression and the related defined parameters of the pressure sensing system 30 are same as some embodiments mentioned in previous and are not discussed here.

The computing module 33 comprises at least one quotient module, the quotient module is suitable for calculating the ratio of the differential resistance value $\Delta R_n$ between resistance values at adjacent moments and the resistance value $R_{n-1}$ of the previous moment, and the value of $\Delta R_n/R_{n-1}$ is obtained.

In the comparing module 34 at least one predefined database is stored, the predefined database is a relational table between pressing force value $F_n$ and $\Delta R_n/R_{n-1}$ and/or $$\sum_{n=1}^{m}(\Delta R_n/R_{n-1})$$

obtained by calculating the values after simulating the amount of resistance value change of the pressure sensing electrode with specific materials and structures after being pressed.

Figure 6:
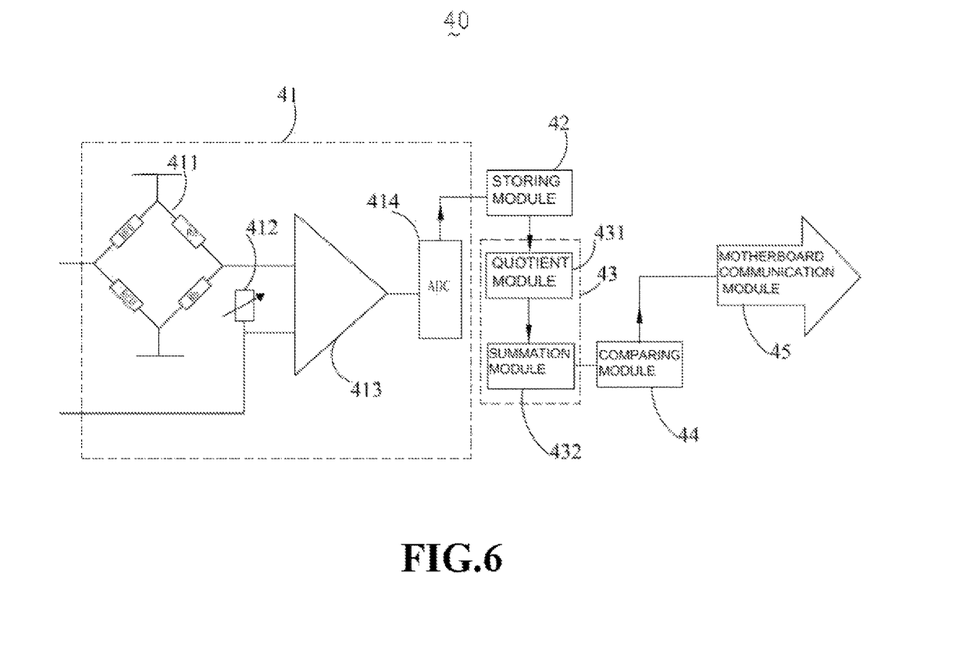
FIG. 6 is a schematic diagram illustrating a pressure sensing system according to sonic other embodiments of the disclosure.

Reference is made to FIG. 6, some embodiments provide a pressure sensing system 40, which comprises plurality pressure sensing electrodes and a resistance detection module 41 connected to the pressure sensing electrode, a storing module 42 connected to the resistance detection module 41, a computing module 43 connected to the storing module 42 and a comparing module 44 connected to the computing module 43, the mentioned pressure sensing system 40 further comprises a motherboard communication module 45 connected to the comparing module 44.

The resistance detection module 41 is suitable for obtaining the resistance value $R_n$ of the pressure sensing electrode.

The storing module 42 is suitable for storing the resistance values $R_n$ detected by the resistance detection module 41.

The computing module 43 is suitable for calculating the resistance values $R_n$ stored in the storing module 42, and calculates and obtains the differential resistance value $\Delta R_n$ between resistance values at adjacent moments and at least one resistance relative change $\Delta R_n/R_{n-1}$, and and summation the plurality $\Delta R_n/R_{n-1}$ to obtain the sum of $\Delta R_n/R_{n-1}$.

The comparing module 44 is suitable for matching the at least one resistance relative change $\Delta R_n/R_{n-1}$ that the computing module 43 calculated and obtained with a pressing force value $F_n$ according to the predefined database, and exports the pressing force value $F_n$ in accordance.

The calculation expression and the related defined parameters of the pressure sensing system 40 are the same as some embodiments mentioned and are not discussed here.

Furthermore, the resistance detection module 41 comprises at least one Wheatstone bridge 411, at least one amplifier 413 and at least one analog to digital converter (ADC) 414.

The Wheatstone bridge 411 is suitable for detecting the resistance value of the pressure sensing electrode and sending out the resistance value signal;

The amplifier 413 is suitable for amplifying the resistance value signal received from the Wheatstone bridge 413.

The analog to digital converter 414 is suitable for converting the resistance value signal to digital signal.

The resistance value $R_n$ of the pressure sensing electrode is obtained by the Wheatstone bridge, after the signal of the resistance value $R_n$ obtained being amplified by the amplifier 413, the analog to digital converter (ADC) converts the resistance value signal into digital signal, and then send the digital signal to the storing module 42.

The amplifier 413 further comprises an amplification factor adjustable resistor 412. The amplification factor adjustable resistor 412 is suitable for adjusting the amplification factor of the amplifier 413.

In some other embodiments, other methods of voltage division are used to replace the Wheatstone bridge 411 of the resistance detection module 41 to detect the resistance value of the pressure sensing electrode.

The computing module 43 comprises at least one quotient module 431 and at least one summation module 432, the data obtained by the storing module 42 are retrieved and calculated by the quotient module 431 to obtain the value of $\Delta R_n/R_{n-1}$ by quotient calculating the differential resistance value $\Delta R_n$ between resistance values at adjacent moments and the resistance value $R_{n-1}$ of the previous moment. The data. that the quotient module obtained after calculation are sent to the summation module 442 for summation calculation, which is, summing up the $\Delta R_n/R_{n-1}$ to obtain the value of $$\sum_{n=1}^{m}(\Delta R_n/R_{n-1});$$

wherein, n is a positive integer. The summation module 342 only does the summation calculation when $\Delta R_n/R_{n-1}$ is smaller than the default value Ka, and terminates the summation calculation when $\Delta R_{n+1}/R_n$ is bigger than the default value Kb, and the value of $$\sum_{n=1}^{m}(\Delta R_n/R_{n-1})$$

is exported.

The comparing module 34 exports the pressing force value $F_n$ in accordance to the motherboard communication module 35.

In some other embodiments of the disclosure, the pressure sensing system is applicable to different equipment with pressure sensing function, and is also applicable to various modes of pressing operation.

In some other embodiments of the disclosure, when adopting the resistance value incremental calculation method of the disclosure, the initial value may be unfixed, the pressure sensing method may ignore the resistance vale change caused by the. resistance value variation of manufacturing process and the environment.

Those skilled in the art may know clear that even in the disclosure only data that are related to the resistance value $R_n$ are measured and calculated, but in actual circuit process, not only resistance value may be measured, obtained, derived and summation calculated, during the process of measuring and calculating, the resistance value change situation may be determined by measuring and calculating the current signal or voltage signal according to a certain correspondence, that is, the measurement, record and calculation of the resistance value situation in the disclosure may also be used to the measurement, record and calculation of the current signal or the voltage signal.

The pressure sensing method and the system thereof in the disclosure have the following advantages.

(1) The pressure sensing method provided in the disclosure may compute the resistance value change caused by the finger pressing opera on, and matches with the predefined database according to $\Delta R_n/R_{n-1}$ and obtain the pressing force value $F_n$ in accordance with $\Delta R_n/R_{n-1}$. By adopting the pressure sensing method in the disclosure, the noise signal caused by the variation factors and the noise signal caused by value obtaining at fixed time are reduced, the pressing force value $F_n$ in accordance is chosen precisely and the accuracy of pressing force detection is improved.

(2) The pressure sensing method provided in the disclosure further comprises: before obtaining the resistance value $R_n$ related, the touching electrode is scanned and whether the position signal is detected or not is determined, thereby the detection of position signal is taken as a touching, signal of triggering the pressure sensing method, and the amount of resistance value change caused by the pressing force and the high sensitivity and accuracy of the signal in accordance is obtained.

(3) In the pressure sensing method and the system thereof 50 provided in the disclosure, the Wheatstone bridge is adopted to detect the resistance value of the pressure sensing electrode, and the amplifier and the analog to digital converter are equipped at the same time, thereby the resistance value change of the pressure sensing electrode is detected precisely, and the signal fidelity of the resistance value change during transmission is assured.

(4) The pressure sensing method provided in the disclosure comprises limitations when obtaining the resistance values $R_n$. That is, only when the resistance value $R_n$ is continuously decreasing may the data be retrieved from the storing module of the resistance value $R_n$, and the calculation to obtain the differential resistance value $\Delta R_n$ between resistance values at adjacent moments and $\Delta R_n/R_{n-1}$ is executed. The aforementioned method may effectively obtain the resistance value $R_n$ when the pressing force value is the main factor that influences the resistance value, so as to improve the efficiency and accuracy of computing, and decrease the energy consumption.

(5) In the pressure sensing method provided in the disclosure, the default value Ka and the default value Kb are further set by simulate calculation to further filter the valid data, thereby the area in accordance with finger pressing and the resistance value change caused by the finger pressing are obtained precisely.

(6) In the pressure sensing method provided in the disclosure, the $\Delta R_n/R_{n-1}$ that are obtained before and after the deformation process and meet the limitation of the default value Ka are summed up to obtain the sum of $\Delta R_n/R_{n-1}$, and the amount of resistance value change of the pressure detection electrode due to pressing force are maximized. Not only the sensitivity of detection is improved but also the resistance value signal is easier to obtain and the maximum of the amount resistance value change of the pressure sensing electrode due to pressing force is easier to obtain. When matching the sum of $\Delta R_n/R_{n-1}$ and the predefined database, the pressing force value $F_n$ in accordance is obtained more precisely.

(7) The pressure sensing system 30 provided by the disclosure comprises resistance detection module 31, storing module 32, computing module 33 and comparing module. 34, wherein, the computing module 33 further comprises quotient module 331 and summation module 332, and the pressure sensing and detection are detected and processed more precisely and effectively.

(8) The pressure sensing method and the system thereof provided in the disclosure is applicable to equipment or apparatus with pressure sensing function to let. the equipment or the apparatus have better sensitivity of pressure sensing and measurement, and the maximum amount of resistance value deformation is obtained. precisely. Furthermore, in the disclosure, with only single layer of pressure sensing electrode being adopted, the influence of variation factors to the determination of pressing force value is lowered, the materials and crafts are saved, the yield is increased, and it is more in accordance with the trend of thinning the pressure sensing electrode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A pressure sensing method, suitable for being applied on a pressure sensing electrode having an initial resistance value $R_0$, the pressure sensing method comprising:
   a step Q11 for sequentially obtaining and storing a plurality of resistance values at different scanning moments, wherein the step Q11 further comprises:
      a step Q111 for obtaining the plurality of resistance values under a pressing operation by utilizing a Wheatstone bridge;

a step Q112 for amplifying the resistance values received from the step Q111 at different scanning moments by an amplifier comparator;

a step Q113 for transforming the resistance values received from the step Q112 into a plurality of digital signals by an analog to digital converter; and a step Q114 for storing the plurality of digital signals received from the step Q113;

a step Q12 for reading a resistance value $R_{n-1}$ of a (n−1)-th scanning moment and a resistance value $R_n$ of a n-th scanning moment from the plurality of digital signals received from the step Q114, and calculating a differential resistance value $\Delta R_n$ between resistance values at adjacent moments, and retrieving a resistance relative change $\Delta R_n/R_{n-1}$, where n is a positive integer; and a step Q13 for matching the resistance relative change $\Delta R_n/R_{n-1}$ with at least one predefined database, so as to obtain a pressing force value $F_n$ corresponding to the resistance relative change $\Delta R_n/R_{n-1}$.

2. The pressure sensing method of claim 1, wherein before the step Q11, the pressure sensing method further comprises:

a step P101 for scanning a touch electrode; and a step P102 for determining whether a touch position signal is detected or not; if the touch position signal is detected, then executing the step Q11 and detecting a resistance value of the pressure sensing electrode; and if the touch position signal is not detected, then executing the step P101 repeatedly.

3. The pressure sensing method of claim 1, wherein between the step Q11 and the step Q12, the pressure sensing method further comprises:

determining whether the resistance values obtained at different scanning moments continuously decrease or not; if the resistance values continuously decrease, then executing the step Q12; and, if the resistance values do not continuously decrease, then returning to the step Q11.

4. A pressure sensing method, suitable for being applied on a pressure sensing electrode having an initial resistance value $R_0$, the pressure sensing method comprising:

a step S103 for obtaining and storing a resistance value $R_n$, wherein the step S103 further comprises:

a step Q111 for obtaining the resistance value $R_n$ under a pressing operation by utilizing a Wheatstone bridge;

a step Q112 for amplifying the resistance value $R_n$ received from the step Q111 by an amplifier comparator;

a step Q113 for transforming the resistance value $R_n$ received from the step Q112 into a digital signal by an analog to digital converter; and a step Q114 for storing the digital signal received from the step Q113;

a step S105 for reading the resistance value $R_n$ from the step Q114, calculating a differential resistance value $\Delta R_n$ between the resistance value $R_n$ and a resistance value $R_{n-1}$, wherein the resistance value $R_{n-1}$ is obtained at a moment previous to the resistance value $R_n$;

a step S106 for calculating a resistance relative change $\Delta R_n/R_{n-1}$ according to the differential resistance value $\Delta R_n$ and the resistance value $R_{n-1}$;

a step S108 for calculating a sum of the resistance relative change $\Delta R_n/R_{n-1}$;

a step S110 for outputting the sum of the resistance relative change $\Delta R_n/R_{n-1}$; and a step S111 for matching the sum of the resistance relative change $\Delta R_n/R_{n-1}$ with at least one predefined database, so as to obtain a pressing force value $F_n$ corresponding the sum of the resistance relative change $\Delta R_n/R_{n-1}$.

5. The pressure sensing method of claim 4, wherein before the step S108, the pressure sensing method further comprises:

a step S107 for determining whether the at least one resistance relative change $\Delta R_n/R_{n-1}$ is smaller than a default value Ka or not; if the at least one resistance relative change $\Delta R_n/R_{n-1}$ is smaller than the default value Ka, then summing up the resistance relative change $\Delta R_n/R_{n-1}$; if the resistance relative change $\Delta R_n/R_{n-1}$ is not smaller than the default value Ka, then returning to the step S103 and obtaining a resistance value $R_{n+1}$ at the next scanning moment, wherein the default value Ka<0.

6. The pressure sensing method of claim 4, wherein after the step S108, the pressure sensing method further comprises:

a step S109 for determining whether another resistance relative change $\Delta R_{n+1}/R_n$ is bigger than a default value Kb, wherein the another resistance relative change $\Delta R_{n+1}/R_n$ is calculated from another differential resistance value $\Delta R_{n+1}$ between resistance values at adjacent moments and the resistance value $R_n$; if the another resistance relative change $\Delta R_{n+1}/R_n$ is bigger than the default value Kb, then terminating calculation of the sum of the resistance relative change $\Delta R_n/R_{n-1}$ and executing the step S110; and, if the another resistance relative change $\Delta R_{n+1}/R_n$ is not bigger than the default value Kb, then executing the step S103, wherein the default value Kb>0.

7. The pressure sensing method of claim 4, wherein before the step S103, the pressure sensing method further comprises:

a step S101 for scanning a touch electrode; and a step S102 for determining whether a touch position signal is detected or not; if the touch position signal is detected, then executing the step S103 and detecting a resistance value of the pressure sensing electrode; and if the touch position signal is not detected, then executing the step S101 repeatedly.

8. The pressure sensing method of claim 4, wherein between the step S103 and the step S105, the pressure sensing method further comprises:

a step S104 for determining whether the resistance values obtained at different scanning moments continuously decrease or not; if the resistance values continuously decrease, then executing the step S105; and, if the resistance values do not continuously decrease, then returning to the step S103.

9. The pressure sensing method of claim 4, wherein the initial resistance value $R_0$ is unfixed.

10. The pressure sensing method of claim 1, wherein in the step Q12, the differential resistance value $\Delta R_n$ is defined as $\Delta R_n = R_n - R_{n-1}$.

11. The pressure sensing method of claim 10, wherein during the pressing operation, the differential resistance value $\Delta R_n$ is a negative integer.

12. The pressure sensing method of claim 10, wherein during a pressing stop operation, the differential resistance value $\Delta R_n$ is a positive integer.

13. The pressure sensing method of claim 4, wherein in the step S105, the differential resistance value $\Delta R_n$ is defined as $\Delta R_n = R_n - R_{n-1}$.

14. The pressure sensing method of claim 13, wherein during the pressing operation, the differential resistance value $\Delta R_n$ is a negative integer.

15. The pressure sensing method of claim 13, wherein during a pressing stop operation, the differential resistance value $\Delta R_n$ is a positive integer.

16. The pressure sensing method of claim 1, wherein the steps Q11, Q12 and Q13 are performed continuously and at the same time.

17. The pressure sensing method of claim 4, wherein the steps S103, S105, S106, S108, S110 and S111 are performed continuously and at the same time.

18. A pressure sensing method, suitable for being applied on a pressure sensing electrode having an initial resistance value $R_0$, the pressure sensing method comprising:
- a step Q11 for sequentially obtaining and storing a plurality of resistance values at different scanning moments, wherein the step Q11 further comprises:
  - a step Q111 for obtaining the plurality of resistance values in a way of utilizing a voltage division;
  - a step Q112 for amplifying the resistance values received from the step Q111 at different scanning moments by an amplifier comparator;
  - a step Q113 for transforming the resistance values received from the step Q112 into a plurality of digital signals by an analog to digital converter; and
  - a step Q114 for storing the plurality of digital signals received from the step Q113;
- a step Q12 for reading a digital signal $R_{n-1}$ of a (n−1)-th scanning moment and a digital signal $R_n$ of a n-th scanning moment from the step Q114, and calculating a differential value $\Delta R_n$ between the digital signal $R_{n-1}$ and the digital signal $R_n$, and calculating a relative change $\Delta R_n/R_{n-1}$, where n is a positive integer; and
- a step Q13 for matching the relative change $\Delta R_n/R_{n-1}$ with at least one predefined database to obtain a pressing force value $F_n$ corresponding to the relative change $\Delta R_n/R_{n-1}$.

19. The pressure sensing method of claim 18, wherein the resistance values in the step Q113 are transformed into a plurality of current digital signals.

20. The pressure sensing method of claim 18, wherein the resistance values in the step Q113 are transformed into a plurality of voltage digital signals.

* * * * *